US007848876B2

(12) United States Patent
Simonds et al.

(10) Patent No.: US 7,848,876 B2
(45) Date of Patent: Dec. 7, 2010

(54) SYSTEM AND METHOD FOR DETERMINING A VEHICLE TRAFFIC ROUTE

(75) Inventors: Craig Simonds, Dearborn, MI (US); Krishnaswamy Venkatesh Prasad, Ann Arbor, MI (US); Thomas Giuli, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 873 days.

(21) Appl. No.: 11/688,322

(22) Filed: Mar. 20, 2007

(65) Prior Publication Data

US 2008/0234926 A1 Sep. 25, 2008

(51) Int. Cl.
*G01C 21/00* (2006.01)
*G06F 19/00* (2006.01)

(52) U.S. Cl. ...................... 701/117; 701/201; 701/213; 340/995.16; 455/456.1

(58) Field of Classification Search ................ 701/117, 701/201, 213, 209; 340/995.16, 995.23, 340/995.28; 455/456.1, 404.2
See application file for complete search history.

(56) References Cited

U.S. PATENT DOCUMENTS 5,808,566 A 9/1998 Behr et al.
6,341,255 B1 * 1/2002 Lapidot ...................... 701/209
6,532,418 B2 * 3/2003 Chun et al. ................. 701/209
6,580,904 B2 * 6/2003 Cox et al. ................ 455/456.2
7,389,179 B2 * 6/2008 Jin et al. ..................... 701/207
7,412,327 B2 * 8/2008 Kauvo et al. ................ 701/209
7,412,328 B2 * 8/2008 Uhlmann et al. ............ 701/213
2004/0030493 A1 * 2/2004 Pechatnikov et al. ........ 701/208
2004/0044472 A1 * 3/2004 Tsuge et al. ................ 701/210
2008/0082256 A1 * 4/2008 Komatsu .................... 701/202

FOREIGN PATENT DOCUMENTS

EP 1130359 B1 2/2001
EP 1750094 A2 2/2007
JP 2000241187 9/2000

* cited by examiner

*Primary Examiner*—Tan Q Nguyen
(74) *Attorney, Agent, or Firm*—Jennifer Stec; Brooks Kushman P.C.

(57) ABSTRACT

Coordinate based vehicle navigation services are provided using text based traffic route information and associated coordinate data received from an off-vehicle source. Traffic route information indicative of a traffic route from an initial location to a destination may be received. The traffic route information may lack geographic coordinate data defining the traffic route. A way-point along the traffic route may be determined based on the traffic route information. Way-point information defining the way-point along the traffic route may be sent to an off-vehicle information provider. The way-point information may lack geographic coordinate data defining the way-point. Way-point geographic coordinate information defining the way-point may be received and the traffic route information may be associated with the way-point geographic coordinate information.

19 Claims, 5 Drawing Sheets

SYSTEM AND METHOD FOR DETERMINING A VEHICLE TRAFFIC ROUTE

BACKGROUND OF THE INVENTION

1. Field of the Invention

The invention relates to systems and methods for determining a vehicle traffic route.

2. Discussion

Geographic coordinate data defining a place of interest along a traffic route may be used to estimate the distance between the place of interest and a current location of a vehicle.

Text based driving directions may lack geographic coordinate data defining places of interest along a traffic route.

SUMMARY

Embodiments of the invention may take the form of a method for determining a traffic route for a vehicle. The method includes sending information defining an initial location of the vehicle and a destination for the vehicle, receiving traffic route information indicative of a traffic route from the initial location to the destination, and determining a way-point along the traffic route. The method also includes sending way-point information defining the way-point along the traffic route, receiving way-point geographic coordinate information defining the way-point, and associating the traffic route information with the way-point geographic coordinate information.

Embodiments of the invention may take the form of a system for determining a traffic route for a vehicle. The system includes a location module that determines a location of the vehicle. The system also includes a connectivity module that sends information defining an initial location of the vehicle and a destination for the vehicle, receives traffic route information indicative of a traffic route from the initial location to the destination, and determines a way-point along the traffic route. The connectivity module also sends way-point information defining the way-point along the traffic route, receives way-point geographic coordinate information defining the way-point, and associates the traffic route information with the way-point geographic coordinate information.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Figure 1:
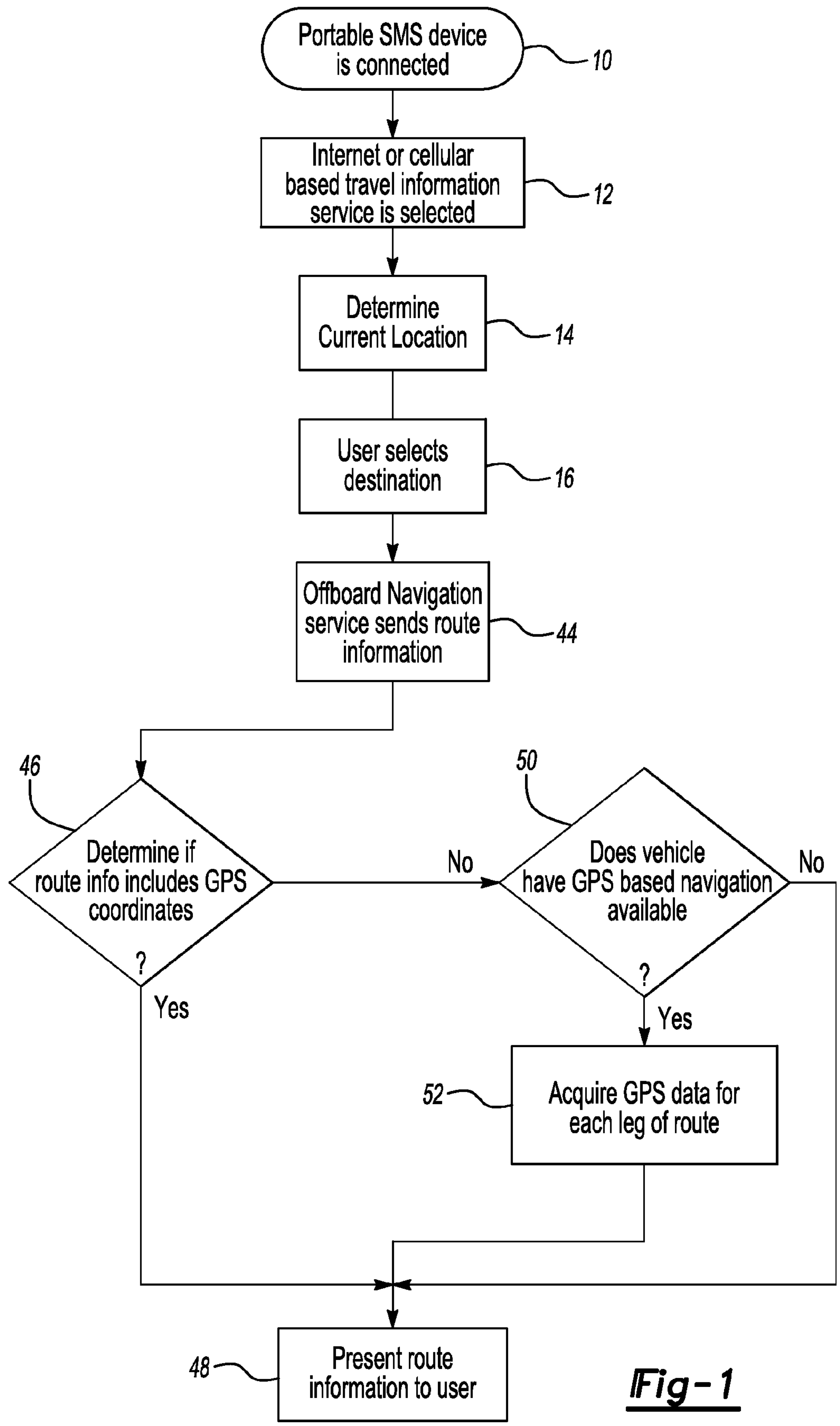
FIG. 1 is a flowchart of a method for text based portable navigation in accordance with an embodiment of the invention.

Certain cellular based travel assistance services accept a description of a current location and destination, and respond with a series of instructions, e.g., SMS text messages, that describe legs of the route between the current location and destination. These text based instructions are not typically linked to geographic coordinate data, e.g., global positioning system (GPS) data. Therefore, it is difficult to associate current vehicle location with a particular leg of the route.

Some of the systems and methods described below manage the text strings provided by a cellular or Internet based service provider and combine it with geographic coordinate data. In some embodiments, this is done by bundling the text messages received from the service provider and associating each leg of the route described with the correct GPS data.

While GPS location data is not necessary, the embodiments described include more than one way to retrieve and associate GPS data with each leg of a journey. GPS data may come with text-based, turn-by-turn directions, or may be acquired by using intermediate points found in the text to request GPS data for each leg. Some embodiments can make use of available GPS based navigation services (on board or off board) to acquire the GPS location for each intermediate point.

Some embodiments may seek the GPS location of intersections or specific addresses. The requests in text and data format may change for each type of request. In some cases, the data is extracted from text strings provided by an off board SMS-based service.

Coordinate data requests for points of interest along a route may be made sequentially or in burst fashion with associated indexing information such that if coordinate data is received out of order, the index can be used to match the coordinate data with the appropriate point of interest.

To acquire coordinate data, a street address, the name of a recognized location, or the names of two streets that intersect, for example, are needed. In the case of an intersection, the pertinent street names may be found in a single string or in a string that describe two consecutive legs of the journey.

Since information describing one leg of a journey (provided by, for example, an SMS-based system) is a string of text, the string may be parsed in individual words or number strings and interpreted. In certain cases, interpretation means understanding which parameter related to navigation the word or number satisfies. For example, a typical string might be: head East on Michigan Ave. toward Schaeffer Rd.—go 0.6 mi.

Some embodiments are able to understand directions, e.g., East, street names and types, e.g., Michigan Ave. or Schaeffer Rd., and addresses if present. These terms may become values for parameters, e.g., street1 is equal to “Michigan Ave.”, street2 is equal to “Schaeffer Rd.”, that will be used to request GPS data from geocoding services.

One, of many, ways to accurately interpret text is to understand the structure of the phrase or sentence. Typically, the name of a road is bounded between a directional preposition, e.g., “on”, “toward”, and “to”, and the term indicating the type of road, e.g., “St”, “Ave”, “Fwy”. The fact that most street names are capitalized in these phrases also helps identify the desired text. Complications may arise from street names like “John C. Lodge” and “East 23$^{rd}$ Street”. In these cases, it may be useful to understand that the street name contains more than one word and terms that typically identify the type of road may also be part of its formal name. Knowing the abbreviations each service uses for road type can improve the success rate of parsing text strings and assignment values to necessary variables.

If there are numerous on-line driving direction services or cellular based driving direction services that are to be used, it may be useful to store patterns for each service provider to provide quick analysis of text strings as formatting and structuring of the text strings may vary from service provider to service provider.

Once the points of interests are identified, the related information may be sent to a geocoding service to acquire GPS data for each. Before dynamic turn-by-turn directions can be presented to a user, the received geographic coordinate data should be associated with the appropriate route segment or leg of the journey. In some embodiments, the coordinate data establishes the end points of each leg while the text describes how to travel to these points.

To describe the process in more detail, the following example four leg journey is provided:

Turn right on Michigan Ave—go 1.1 mi

Turn right at S Telegraph Rd—go 2.3 mi

Take the ramp onto I-94 W toward Chicago—go 23 mi

Merge onto I-275 S via exit 194 to Toledo/Flint—go 17 mi

To acquire GPS data, some embodiments would have extracted the following three intersections from the text and requested the GPS coordinates of each: Michigan and Telegraph, Telegraph and I-94, and I-94 and I-275. These intersections are the end points of the two middle legs of the journey. In this case, the end points, e.g., GPS coordinates, would be stored with the text that describes each leg in a list. This list may take the following form (using the example directions above):

"Turn right at S. Telegraph Rd.", 42.2997, −83.2719

"Take the ramp onto I-94 W toward Chicago", 42.2987, −83.2709

Each element in the list starts with a text description leading the driver to the next point. The first element in the list above tells the driver to get to the intersection of Michigan Avenue and Telegraph Road and then turn right. The GPS location of the Michigan Ave./Telegraph Rd. intersection (42.2997, −83.2717) is stored in the same list element as the text description of how to get there. The next element in the list above tells the driver to drive to the I-94 W ramp and to take I-94 W toward Chicago. The text and coordinate data, however, may be stored in any desired fashion.

As the vehicle reaches a predefined distance, e.g., one mile, from the next point of interest, the vehicle will notify the driver that they need to make a turn. As the vehicle reaches another predefined distance, 100 feet, from the point of interest, the vehicle may again notify the driver that they need to make a turn.

There are a number of algorithms that may be used to determine the vehicle's position relative to the points of interest, including interpolating between GPS data points. Another method is to periodically calculate the distance to the next point by using the great-circle method. The great-circle distance, D, between any two points O and S on a sphere is calculated with the formula:

$$\text{Cos } D = (\text{Sin } o \text{ Sin } s) + (\text{Cos } o \text{ Cos } s \text{ Cos}|xy|)$$

where o and s are the latitudes of O and S and where |xy| is the absolute value of the difference in longitude between O and S.

After the GPS data is received and associated with intersections or other points of interest extracted from the original SMS messages, the system is ready to deliver the information to the user. In some embodiments, the application is able to use the acquired data to estimate the distance between the vehicle's location and the next way point in order to notify the driver of the next turn, or the transition to the next leg of the journey.

The information may be presented to the user in a variety of ways. Text or graphic displays and text-to-speech (TTS) systems may be used together or alone for playback. If GPS data for both the route and the vehicle's current location are available, the playback may automatically transition through the legs of the journey. If no location data is available, the driver may have controls to assist perusing the text on a leg-by-leg basis. Again, this may be provided on the display or delivered audibly by a TTS engine. Another method is to use both a text display, showing or highlighting the current leg of the route, and an audible (TTS) system to alert the driver of an approaching turn or change direction.

FIG. 1 is a flowchart showing an embodiment of text based portable navigation. At 10, a portable SMS device, e.g., cellular phone, is connected with the vehicle such that it may communicate with a controller and/or processor on-board the vehicle. At 12, a user selects, from an option menu for example, Internet or cellular based travel information service. At 14, the vehicle determines its current location using any conventional technology, e.g., GPS sensor integrated with the vehicle or cellular phone. At 16, the user selects their destination.

Figure 2:
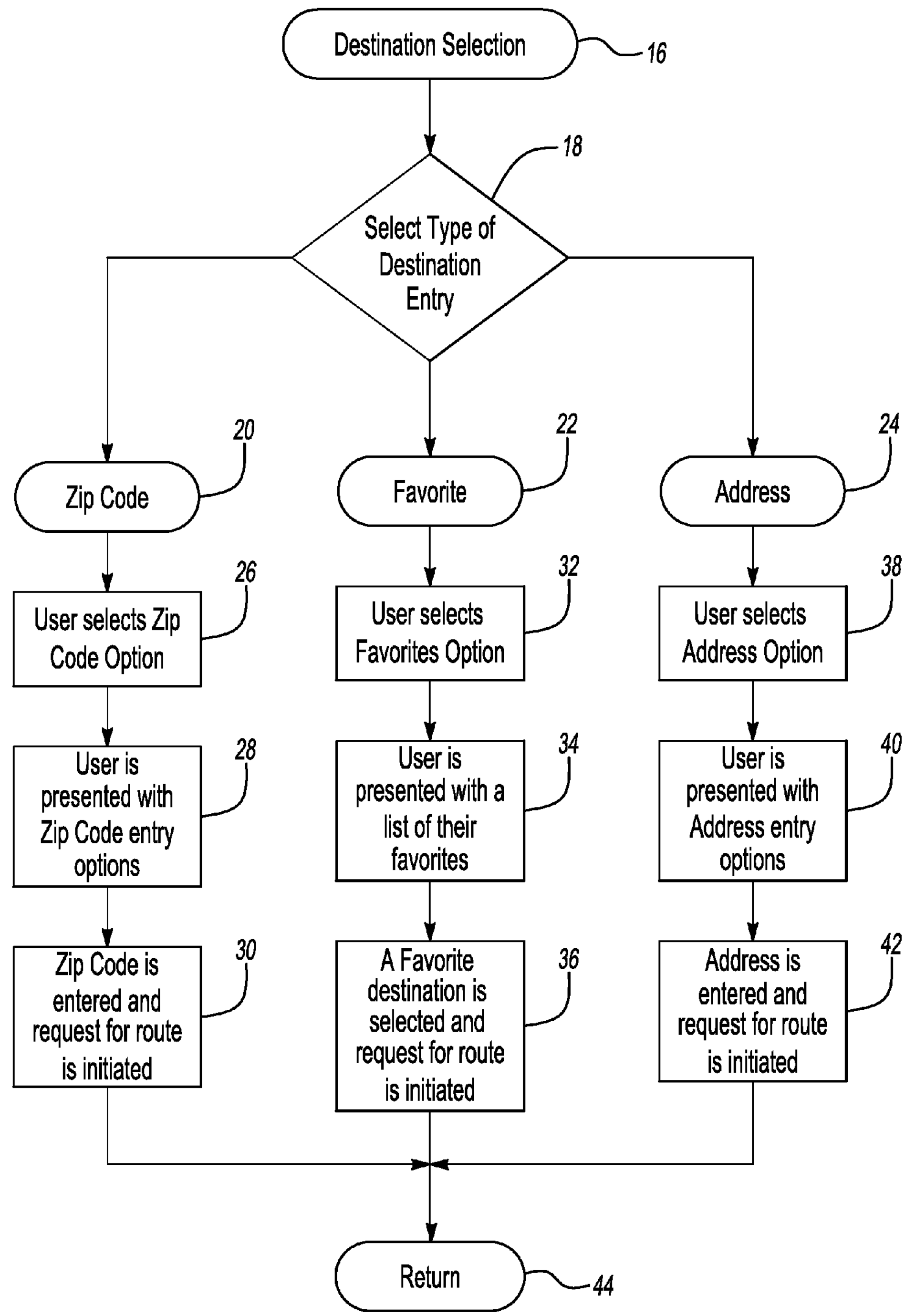
FIG. 2 is a flowchart of a method for destination selection in accordance with an embodiment of the invention.

FIG. 2 is a flowchart showing several methods for a user to select a destination. At 18 a user is offered the option to select among several types of destination criteria including zip code 20, favorite 22, or address 24.

If the user selects the zip code option at 26, the user is presented with zip code entry options at 28. At 30, the desired zip code information is entered and request for route initiated.

If the user selects the favorite option at 32, the user is presented with a list of their favorite destinations at 34. At 36, a favorite destination is selected and request for route initiated.

If a user selects the address option at 38, the user is presented with address entry options at 40. At 42, a destination address is entered and request for route initiated.

Referring to FIG. 1, at 44, an off-board navigation service sends the route information. At 46, it is determined whether the route information received includes GPS coordinates. If yes, at 48, route information is presented to the user. If no, at 50, it is determined whether the vehicle has GPS based navigation services available. If no, at 48, the system presents the route information to the user. If yes, at 52, the system acquires GPS data for each leg of the route.

Figure 3:
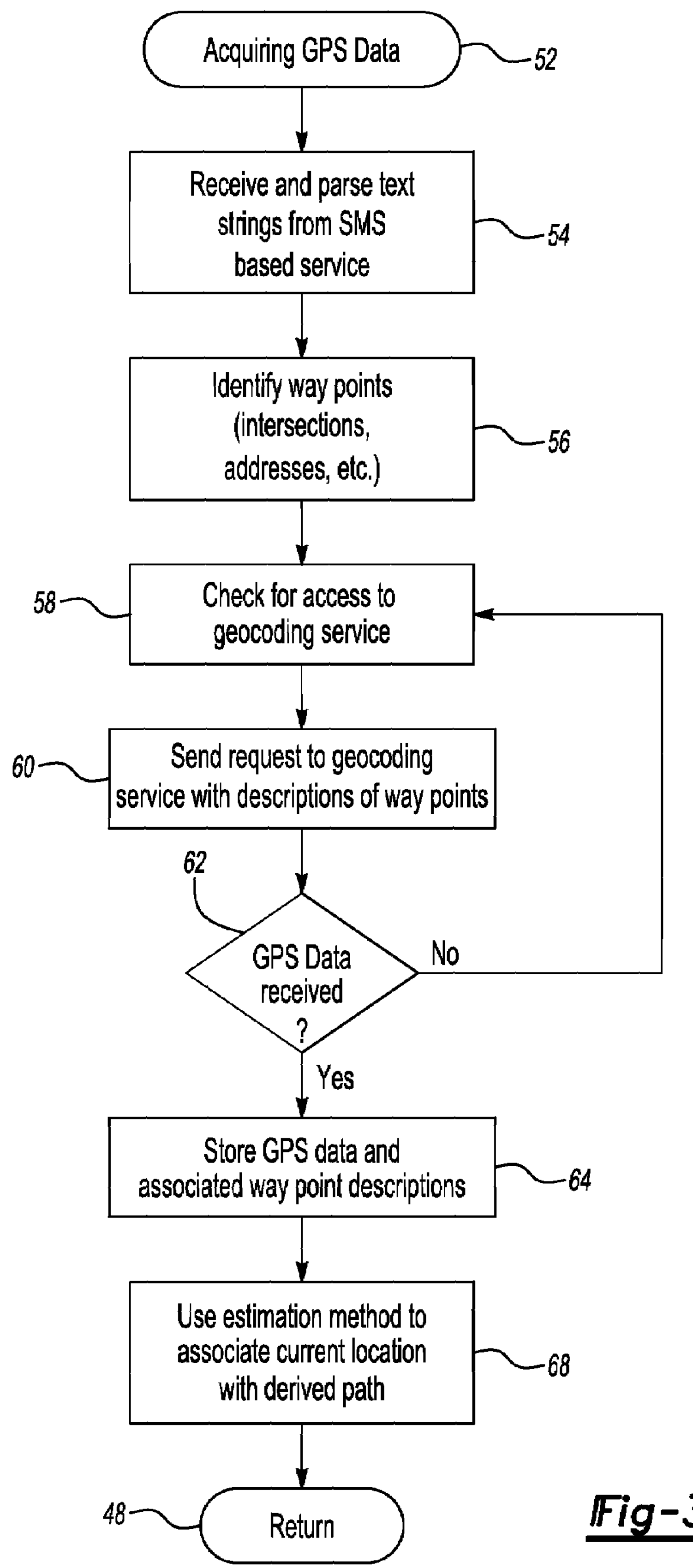
FIG. 3 is a flowchart of a method for acquiring geographic coordinate data in accordance with an embodiment of the invention.

FIG. 3 is a flowchart showing the steps taken to acquire GPS data. At 54, text strings from SMS-based services are received and parsed. At 56, way points are identified. At 58, a check for access to geocoding services is made. At 60, a request is sent to the geocoding service with descriptions of the way points. At 62, a check as to whether GPS data has been received in response to the request sent at step 60 is made. If no, the method returns to step 58. If yes, the method proceeds to step 64, where the GPS data and associated way point descriptions are stored. At 68, the system uses an estimation method to associate current location with the derived path.

Figure 4:
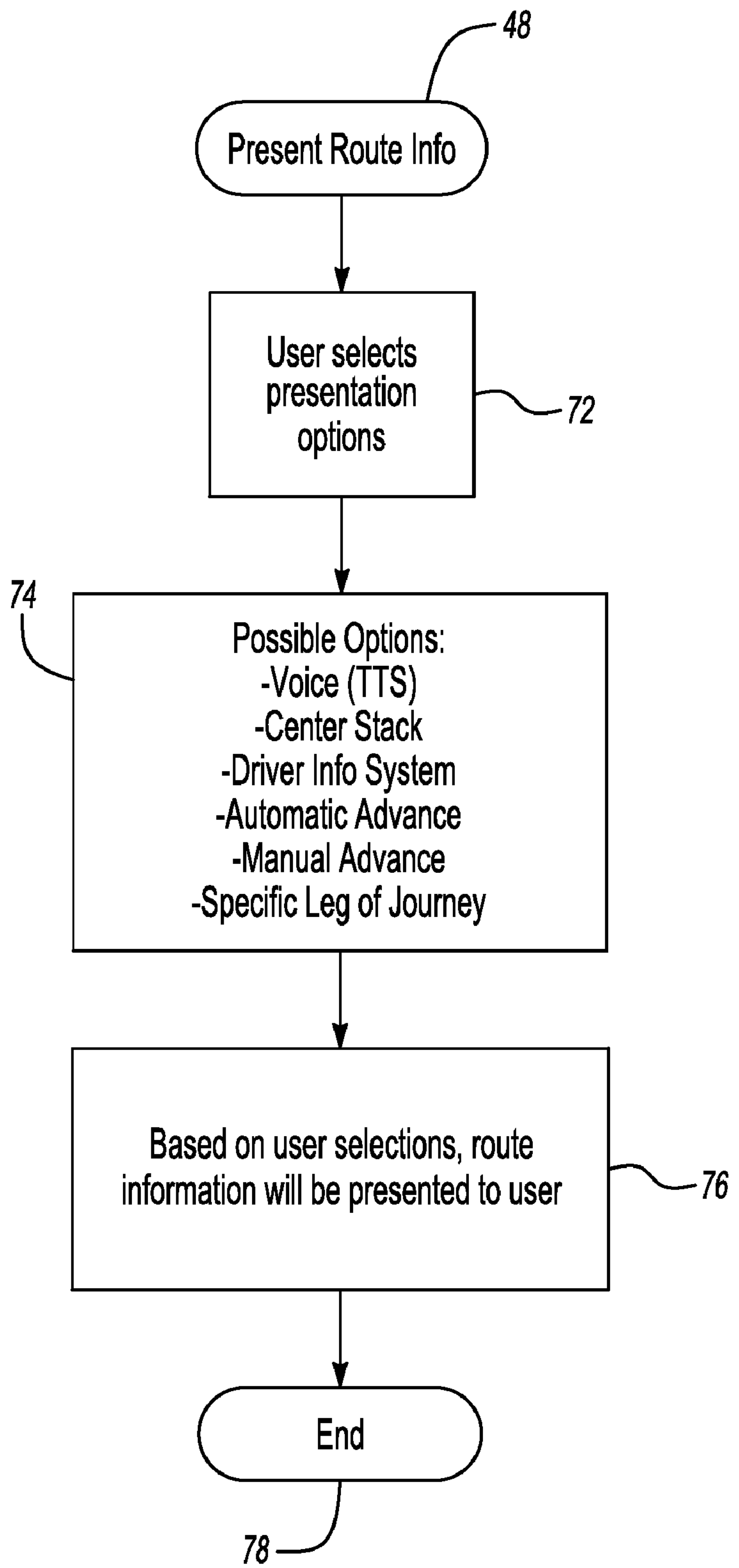
FIG. 4 is a flowchart of a method for presenting route information to a user in accordance with an embodiment of the invention.

FIG. 4 is a flowchart showing a method for presenting route information to the user. At step 72, the user selects presentation options. At 74, the possible presentation options include voice, center stack, driver info system, automatic advance, manual advance, and specific leg of journey. At 76, based on the user's selections, route information will be presented to the user.

Figure 5:
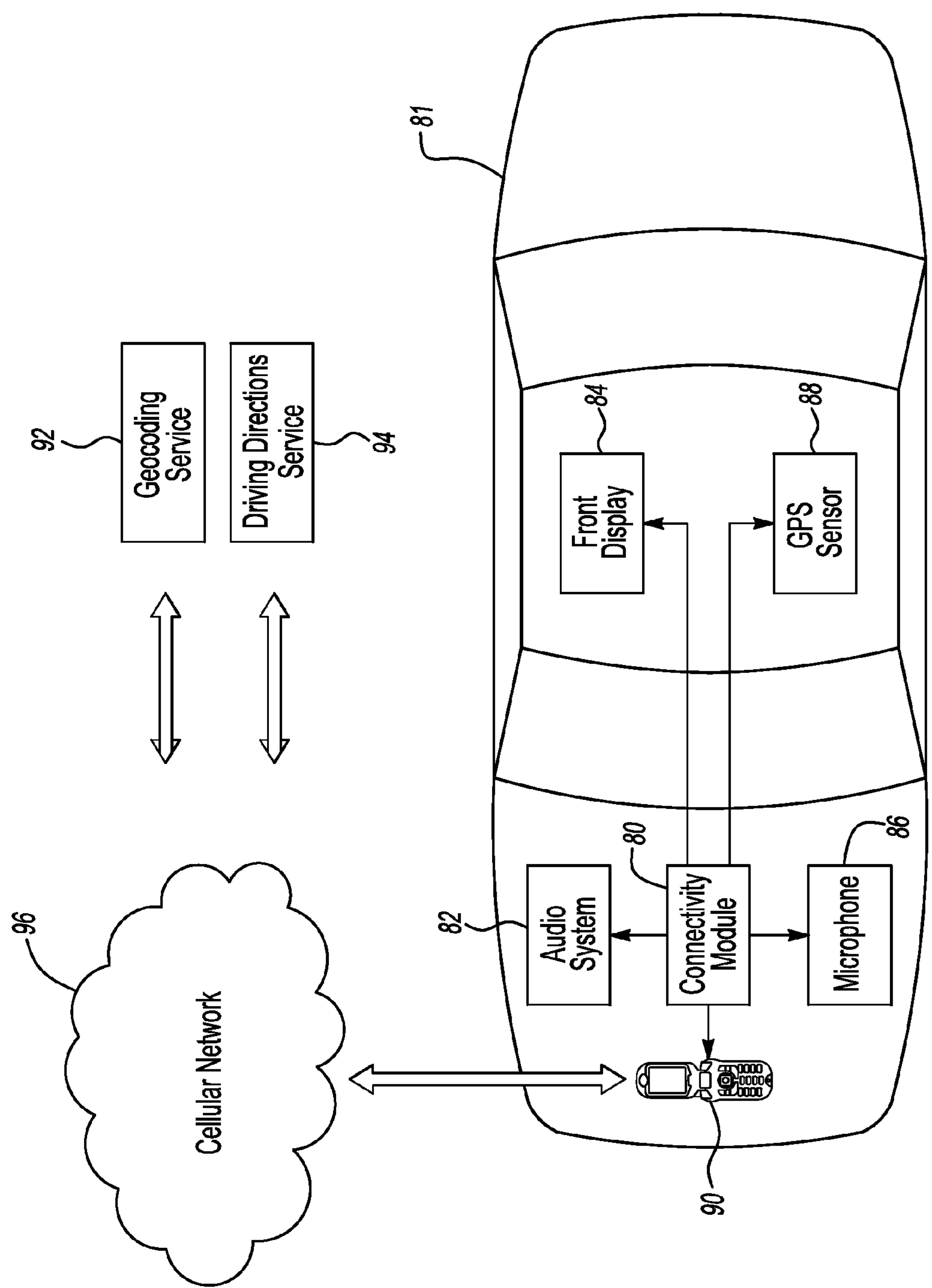
FIG. 5 is a block diagram of a system for text based portable navigation in accordance with an embodiment of the invention.

FIG. 5 is a block diagram of a system for text based portable navigation. Vehicle 81 includes connectivity module 80, audio system 82, front display 84, microphone 86, and GPS sensor 88. Connectivity module 80, e.g., processors, memory, and transceiver, is in communication with audio system 82, front display 84, microphone 86, and GPS sensor 88. The above may communicate, for example, via a car area network or direct hard line connection.

Connectivity module 80 includes a docking port for cell phone 90 which permits connectivity module 80 to communicate with cell phone 90. In the embodiment of FIG. 5, cell phone 90 is used to facilitate communication between the vehicle and geocoding service 92 and driving directions service 94 via cellular network 96. In other embodiments, connectivity module 80 may communicate with geocoding service 92 and driving directions service 94 via, for example, a wide area network or other Internet based communication technology.

Front display 84/microphone 86 allow a user to select SMS driving directions and submit to/from information. That information is fed to connectivity module 80 which requests driving directions from driving direction service 94 via a signal transmitted by cell phone 90 over cellular network 96. Driving directions service 94 provides SMS based driving directions back to connectivity module 80 via cellular network 96 and cell phone 90. Connectivity module 80 stores text received and analyzes it to determine points of interest. Once the points of interest have been determined, connectivity module 80 requests geographic coordinate data from geocoding service 92 via a signal transmitted by cell phone 90 via cellular network 96. In response, geocoding service 92 returns points of interest GPS data. Connectivity module 80 then associates the GPS data with text containing driving directions as described above. Directions are then presented to the user by front audio system 82/front display 84 using the GPS data to determine the location of vehicle 81 relative to the turn-by-turn directions.

In the embodiment of FIG. 5, GPS sensor 88 may determine the coordinate data for the location of vehicle 81. If GPS sensor 88 is absent from vehicle 81, cell phone 90, e.g., a GPS enabled cell phone, may determine the coordinate data of a location for vehicle 81.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for determining a traffic route for a vehicle comprising:
- receiving initial location information defining an initial location of the vehicle;
- receiving input defining a destination for the vehicle;
- sending information, to an off-vehicle information provider, defining the initial location of the vehicle and destination for the vehicle;
- receiving traffic route information including at least one text message indicative of a traffic route from the initial location to the destination, the traffic route information lacking geographic coordinate data defining the traffic route;
- determining a way-point along the traffic route based on the traffic route information by parsing words of the at least one text message;
- sending way-point information, to an off-vehicle information provider, defining the way-point along the traffic route, the way-point information lacking geographic coordinate data defining the way-point;
- receiving way-point geographic coordinate information defining the way-point;
- associating the traffic route information with the way-point geographic coordinate information;
- determining a distance between a current location of the vehicle and the way-point; and
- informing a user of the distance between the current location of the vehicle and the way-point.

2. The method of claim 1 wherein the step of determining a distance between a current location of the vehicle and the way-point includes determining the current location of the vehicle.

3. The method of claim 1 wherein the step of determining a distance between a current location of the vehicle and the way-point includes determining geographic coordinate data of the current location of the vehicle.

4. The method of claim 1 wherein the information defining the initial location of the vehicle and the destination for the vehicle is sent via short message service.

5. The method of claim 1 wherein the way-point information defining the way-point along the traffic route is sent via short message service.

6. The method of claim 1 wherein the way-point geographic coordinate information comprises global positioning system data.

7. The method of claim 1 wherein the step of receiving an initial location of the vehicle includes receiving geographic coordinate data of the initial location of the vehicle.

8. The method of claim 7 wherein the geographic coordinate data of the initial location of the vehicle comprises global positioning data.

9. The method of claim 1 wherein the step of determining a way-point along the traffic route based on the traffic route information includes determining where two roads along the traffic route intersect.

10. The method of claim 1 further comprising determining an initial location of the vehicle.

11. A system for determining a traffic route for a vehicle comprising:
- a location module configured to determine an initial location of the vehicle;
- a processing module configured to
  - receive input defining a destination for the vehicle,
  - send information defining the initial location of the vehicle and destination for the vehicle,
  - receive traffic route information including at least one text message indicative of a traffic route from the initial location to the destination, the traffic route information lacking geographic coordinate data defining the traffic route,
  - determine a way-point along the traffic route based on the traffic route information by parsing words of the at least one text message,
  - send way-point information defining the way-point along the traffic route, the way-point information lacking geographic coordinate data defining the way-point,
  - receive way-point geographic coordinate information defining the way-point,
  - associate the traffic route information with the way-point coordinate information, and determine a distance between a current location of the vehicle and the way-point; and an interface module configured to inform a user of the distance between the current location of the vehicle and the way-point.

12. The system of claim 11 wherein the location module is further configured to determine a current location of the vehicle.

13. The system of claim 11 wherein the location module is further configured to determine geographic coordinate data of the current location of the vehicle.

14. The system of claim 11 wherein the processing module includes a cell phone configured to transmit the information defining the current location of the vehicle and the destination for the vehicle via short message service.

15. The system of claim 11 wherein the processing module includes a cell phone configured to transmit the way-point information defining the way-point along the traffic route via short message service.

16. The system of claim 11 wherein the way-point coordinate information comprises global positioning system data.

17. The system of claim 11 wherein the location module is further configured to determine geographic coordinate data of the initial location of the vehicle.

18. The system of claim 17 wherein the geographic coordinate data of the initial location of the vehicle comprises global positioning data.

19. The system of claim 11 wherein the processing module is further configured to determine where two roads along the traffic route intersect.

* * * * *